July 4, 1933.   J. C. DIEHL   1,916,920
ORIFICE METER
Filed Oct. 18, 1928
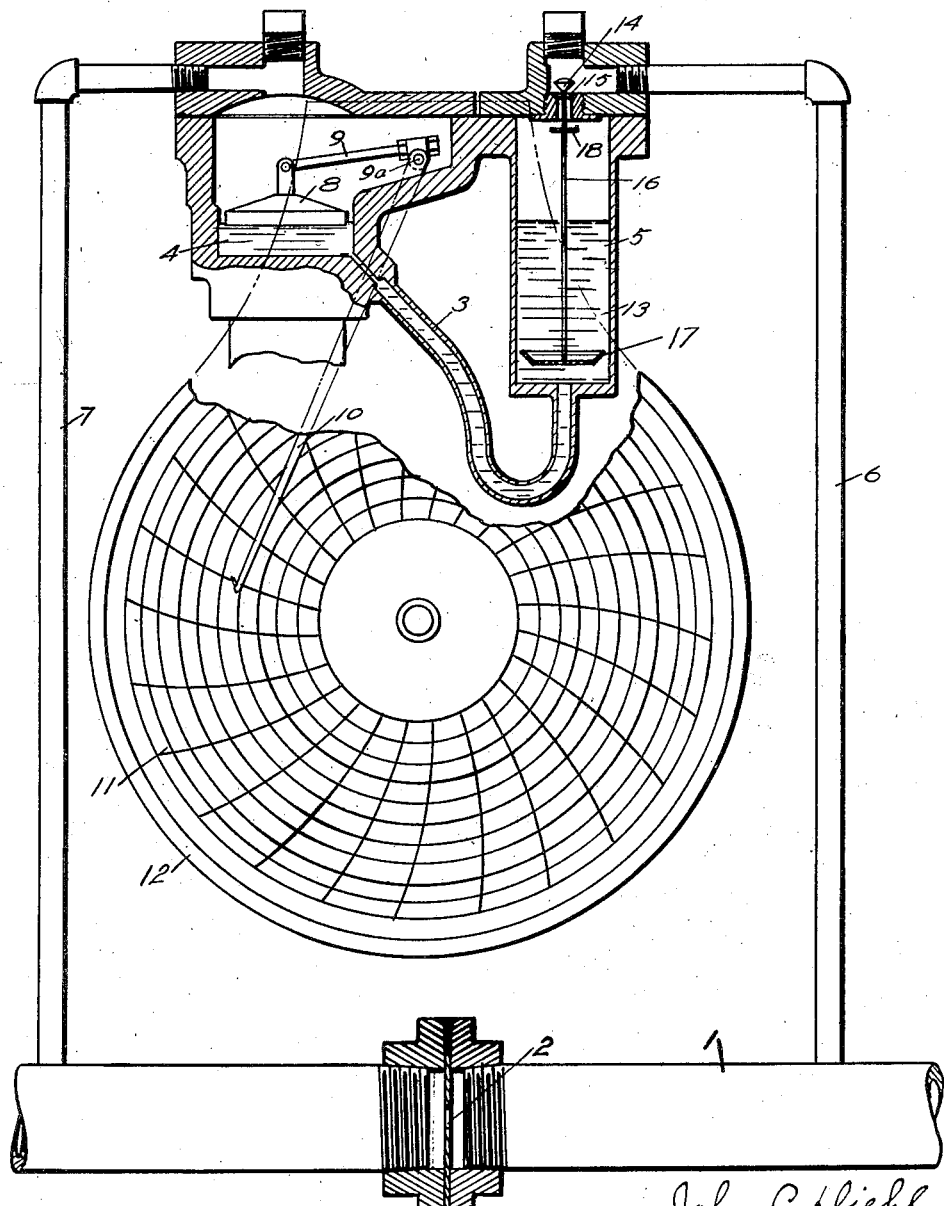
John C. Diehl
INVENTOR.
BY
ATTORNEY Patented July 4, 1933

1,916,920

UNITED STATES PATENT OFFICE

JOHN C. DIEHL, OF ERIE, PENNSYLVANIA, ASSIGNOR TO AMERICAN METER COMPANY, OF NEW YORK, N. Y., A CORPORATION OF DELAWARE

ORIFICE METER

Application filed October 18, 1928. Serial No. 313,334.

Orifice meters as ordinarily made are provided with means for measuring the differential pressure as between the pressures at the up-stream and down-stream sides of the orifice. These differential pressure devices commonly involve the use of a U-tube, the liquid being usually in the form of mercury. With sudden fluctuations of pressure there is a tendency to throw the mercury out of the U-tube, not only involving a loss of the mercury but also due to this loss, if not discovered resulting in a faulty action of the meter. There is often foreign matter carried into one leg of the U-tube, this also resulting in faulty action of the device. This difficulty has heretofore been taken care of by supplying check valves at each side of the U-tube preventing a flow from the U-tube to the connections leading to the conduit. Inasmuch as these violent fluctuations almost invariably arise in the connection leading to the up-stream side I have found that by checking an inflow from this up-stream connection when there is a violent variation it is possible to avoid an injurious action upon the mercury, or liquid in the U-tube. Features and details of my invention will appear from the following specification and claims.

A preferred embodiment of the invention is illustrated in the accompanying drawing showing a front view of the differential feature of an orifice meter, partly in section.

1 marks the conduit, 2 an orifice in the conduit, and 3 a U-tube. One end of the U-tube terminates in a float chamber 4 and the opposite end in a small chamber 5. The chamber 5 is connected with the conduit at the up-stream side of the orifice by a pipe 6 and the chamber 4 is connected with the conduit at the down-stream side of the orifice by a pipe 7.

A float 8 operates in the chamber. It is connected by an arm 9 with a shaft 9a on which is arranged a pen arm 10 operating on a chart 11, the chart 11 being actuated from a mechanism carried in a case 12. The U-tube is supplied with a liquid, as before stated, usually mercury 13. These parts are of ordinary and well-known construction.

A check valve 14 is arranged in the connection 6 and operates on a seat 15. When closed it prevents a movement of fluid from the connection 6 to the chamber 5. This check valve is connected by a stem 16 with a float 17, this float being formed by an ordinary plate of metal lighter than the mercury and being cup shaped so that if the mercury is forced below it, it will trap a quantity of mercury and thus increase its weight. The float with the stem and valves is nicely adjusted as to weight with relation to the part acted upon by the mercury that it holds the valve 14 normally in its open position. A shoulder 18 limits the upward movement of the valve 14. This shoulder 18 may be adjusted to afford in itself a closure of the connection to the pipe 6, if desired, to prevent an out-flow of mercury on a sudden reduction in pressure in the up-stream side of the line. In such case the range of movement bringing the shoulder 18 to closing position, or the valve 14 to closing position should be equal to the normal range of levels of the mercury.

What I claim as new is:—

1. In a differential pressure indicating device, the combination of a U-tube; a liquid in the U-tube; pressure pipes leading to the ends of the U-tube; a check valve at the entrance to the U-tube checking an abnormal inflow to the U-tube; a float in the U-tube; means connecting the float to the check valve so that the float will hold the check valve normally open and said float being submerged and retarding the down-flow of liquid above it.

2. In an orifice meter, the combination of a conduit; an orifice plate in the conduit; a differential pressure device comprising a U-tube; means connecting its ends with the conduit at the opposite sides of the orifice plate; a liquid in the U-tube; a check valve at the entrance to the U-tube checking an abnormal inflow to the U-tube; a float in the U-tube; means connecting the float to the check valve so that the float will hold the check valve normally open, said float being submerged and retarding the down-flow of liquid above it.

3. In a differential pressure indicating device, the combination of a U-tube; liquid in the U-tube; pressure pipes leading to the ends of the U-tube; a check valve; a cup-shaped float in the U-tube adapted to hold a liquid when the liquid falls below the level of the float; and means connecting the float to the check valve so that the float will hold the check valve normally open.

In testimony whereof I have hereunto set my hand.

JOHN C. DIEHL.